US012542223B2

(12) United States Patent
Lu et al.

(10) Patent No.: US 12,542,223 B2
(45) Date of Patent: Feb. 3, 2026

(54) CABLE AND CABLE ASSEMBLY

(71) Applicants: Tyco Electronics (Dongguan) Ltd., Dongguan (CN); Tyco Electronics (Shanghai) Co., Ltd., Shanghai (CN)

(72) Inventors: Hainan (Harlan) Lu, Dongguan (CN); Zhiwei (Jack) Guo, Dongguan (CN); Chunjie Ma, Dongguan (CN)

(73) Assignees: Tyco Electronics (Dongguan) Ltd., Dongguan (CN); Tyco Electronics (Shanghai) Co., Ltd., Shanghai (CN)

( * ) Notice: Subject to any disclaimer, the term of this patent is extended or adjusted under 35 U.S.C. 154(b) by 9 days.

(21) Appl. No.: 17/901,922

(22) Filed: Sep. 2, 2022

(65) Prior Publication Data

US 2023/0063718 A1 Mar. 2, 2023

(30) Foreign Application Priority Data

Sep. 2, 2021 (CN) ......................... 202111029165.8

(51) Int. Cl.
*H01B 11/18* (2006.01)
*H01B 11/10* (2006.01)
*H01B 11/20* (2006.01)

(52) U.S. Cl.
CPC ..... *H01B 11/1808* (2013.01); *H01B 11/1826* (2013.01); *H01B 11/20* (2013.01)

(58) Field of Classification Search
CPC . H01B 11/1016; H01B 11/20; H01B 11/1826; H01B 11/1808; H01B 11/06; H01B 11/002; H01B 7/0275
See application file for complete search history.

(56) References Cited

U.S. PATENT DOCUMENTS

| | | | | |
|---|---|---|---|---|
| 2005/0109522 A1* | 5/2005 | Ysbrand | H01B 1/22 174/36 |
| 2014/0144696 A1* | 5/2014 | Nagahashi | H01B 7/0045 174/102 R |
| 2016/0343474 A1* | 11/2016 | Nichols | H01B 11/1891 |
| 2019/0221332 A1* | 7/2019 | Grant | H01B 11/1847 |
| 2021/0074452 A1* | 3/2021 | Baechtle | H01B 11/06 |

* cited by examiner

*Primary Examiner* — Timothy J Thompson
*Assistant Examiner* — Amol H Patel
(74) *Attorney, Agent, or Firm* — Barley Snyder

(57) ABSTRACT

A cable includes a pair of conductors extending longitudinally and spaced apart from each other, an inner insulating layer circumferentially extending around an outside of the conductors and fixing the conductors, a conductive shielding layer circumferentially extending around an outside of the inner insulating layer, and an insulating sheath extending around an outer peripheral surface of the conductive shielding layer. The insulating sheath is at least one of an extruded layer and a heat shrinkable sleeve.

10 Claims, 2 Drawing Sheets

CABLE AND CABLE ASSEMBLY

CROSS-REFERENCE TO RELATED APPLICATION

This application claims the benefit of the filing date under 35 U.S.C. § 119(a)-(d) of Chinese Patent Application No. 202111029165.8, filed on Sep. 2, 2021.

FIELD OF THE INVENTION

Embodiments of the present disclosure relate generally to a cable, and more particularly, to a cable, such as a twinaxial cable, and a cable assembly including the cable, which are capable of transmitting data at higher data transmission rates.

BACKGROUND

A conventional structure of a data transmission cable comprises a pair of insulated conductors, a conductive shielding layer wrapping around the insulated conductors and a ground wire, and an outer insulating layer wrapping around an outside of the conductive shielding layer. A high-frequency test bandwidth that the conventional structure can achieve is generally low, which cannot meet the requirements of higher-frequency data transmission, and the high-frequency performance is unstable. Further, it is usually necessary to wind the outer insulating layer and/or the shielding layer turn by turn, resulting in low production efficiency.

SUMMARY

A cable includes a pair of conductors extending longitudinally and spaced apart from each other, an inner insulating layer circumferentially extending around an outside of the conductors and fixing the conductors, a conductive shielding layer circumferentially extending around an outside of the inner insulating layer, and an insulating sheath extending around an outer peripheral surface of the conductive shielding layer. The insulating sheath is at least one of an extruded layer and a heat shrinkable sleeve.

BRIEF DESCRIPTION OF THE DRAWINGS

The present invention will become more apparent by describing in detail exemplary embodiments thereof with reference to the accompanying drawings, in which.

DETAILED DESCRIPTION OF THE EMBODIMENTS

Figure 1:
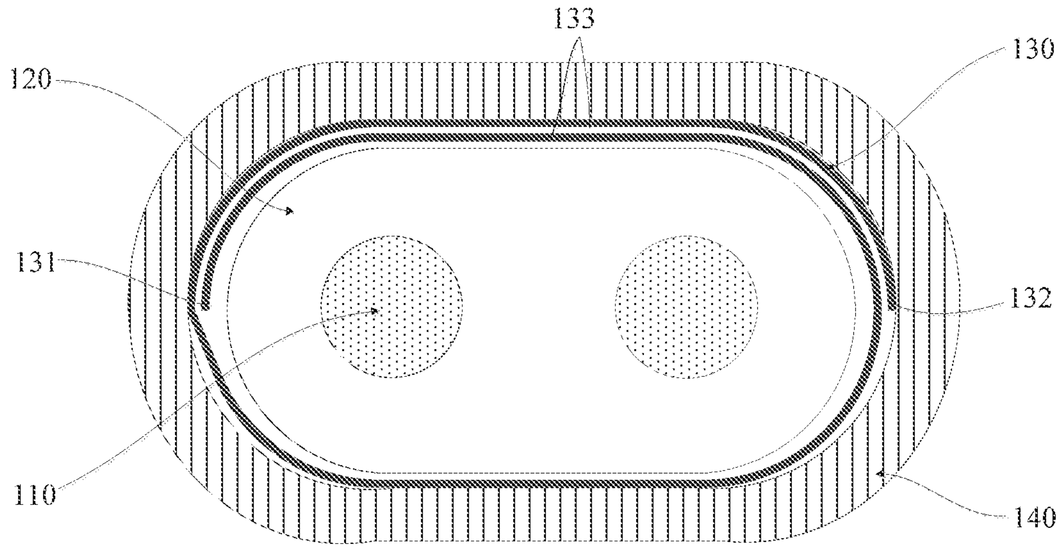
FIG. 1 is a sectional radial view of a structure of a cable according to an embodiment.

Embodiments of the present disclosure will be described hereinafter in detail taken in conjunction with the accompanying drawings. In the description, the same or similar parts are indicated by the same or similar reference numerals. The description of each of the embodiments of the present disclosure hereinafter with reference to the accompanying drawings is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 2:
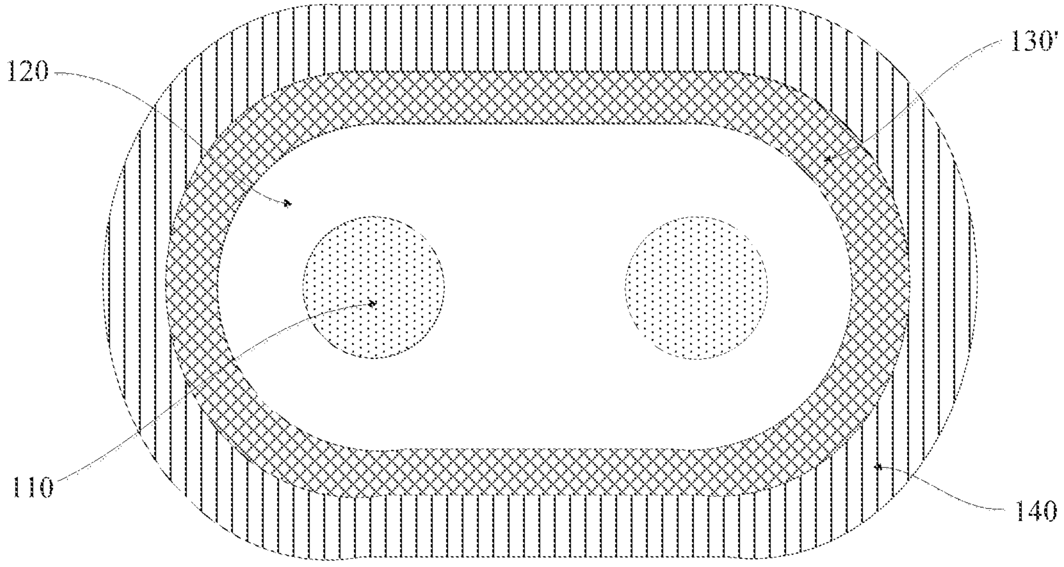
FIG. 2 is a sectional radial view of a structure of a cable according to another embodiment.

As shown in FIGS. 1 and 2, according to exemplary embodiments of the present disclosure, there is provided a cable, such as a twinaxial cable or a differential cable, for stable data transmission at higher transmission rates, such as a frequency bandwidth of up to 60 GHz or higher.

As shown, the cable according to the embodiments of the present disclosure comprises at least two conductors 110 for transmitting signals or data, which are arranged to extend longitudinally and be spaced apart from each other. As an example, the conductor 110 may be made of a high-conductivity material such as a copper conductor, a silver-plated wire, and its diameter is, for example, 0.20 mm or more.

As shown in FIGS. 1 and 2, the cable according to the embodiments of the present disclosure further comprises an inner insulating layer 120, a conductive shielding layer 130 and an outer insulating layer 140 which are sequentially arranged from inside to outside. The inner insulating layer 120 is circumferentially wrapped around an outside of the at least two conductors 110 so as to fix the at least two conductors 110. The conductive shielding layer 130 is circumferentially wrapped around an outside of the inner insulating layer 120 to provide signal shielding function for the cable. The outer insulating layer 140 may be formed in in the form of a sheath or sleeve and is wrapped around an outer peripheral surface of the conductive shielding layer 130.

In a conventional cable, an insulating tape or a Mylar sheet is usually wound around an outside of the conductive shielding layer in a longitudinal direction. The winding is time-consuming and inefficient, and there is a winding pitch and a return loss with the insulating tape or the Mylar sheet, thus, the high-frequency test bandwidth of the conventional cable with this structure could only reach about 40 GHz, and the performance of the cables is unstable.

However, according to the exemplary embodiments of the present disclosure, the outer insulating layer or sheath 140 comprises an extruded layer and/or a heat shrinkable sleeve that is circumferentially wrapped around the outer peripheral surface of the conductive shielding layer 130. The extruded layer is, for example, a continuous insulating layer extending longitudinally over the outer peripheral surface of the conductive shielding layer 130. The extruded layer can be integrally and efficiently formed on the outer peripheral surface of the conductive shielding layer 130 by extrusion process; and the heat shrinkable sleeve can also be easily assembled and used to fix the conductive shielding layer 130 by the heat shrinkage performance of the heat shrinkable sleeve. Thereby, the production efficiency is significantly improved, and the above-mentioned pitch is eliminated, which can significantly improve the performance of the cable, such as increasing the high-frequency test bandwidth of the cable to a higher frequency, such as 60 GHz or higher, so that the cable can be used as a cable suitable for higher rate data transmission.

The outer insulating layer 140 may be made of insulating materials such as polyester, polypropylene, polyethylene terephthalate ("PET" for short). In some examples, the outer insulating layer 140 can be formed by stacking a plurality of insulating sub-layers to enhance the toughness of the cable when bending to be used, wherein at least one insulating sub-layer may be an extruded layer, and/or at least one insulating sub-layer (for example, the outermost insulating sub-layer) may be a heat shrinkable sleeve.

Furthermore, in the conventional cable, the insulating layer is wound around or bonded to the outside of each conductor to form an insulated core wire, and outer peripheries of the insulating layers of the adjacent insulated core wires are abutted against each other. There is a gap between the adjacent insulated core wires, which causes the cable structure to be easily deformed or the core wire to be displaced, thus the data transmission performance is unstable.

Compared with the conventional cable, in the exemplary embodiment of the present disclosure, all conductors of the same cable are wrapped by a single inner insulating layer 120, the material of the inner insulating layer 120 is filled in a space between the wrapped conductors 110, and the inner insulating layer 120 and all conductors 110 wrapped therein form a stable integrated structure. This ensures that the conductors 110 will not be displaced and the cable structure will not be deformed or less deformed in use, such as when bending to be used, and the performance stability of the cable will be improved.

In some embodiments, the inner insulating layer 120 is a single extruded layer that wraps around each conductor 110 along a longitudinal length of the at least two conductors 110. The inner insulating layer 120 may be made of insulating polymer material. For example, the inner insulating layer 120 is formed over the at least two conductor 110 by a single extrusion step using the insulating material, such as polyolefin, polytetrafluoroethylene (PTFE), polyethylene terephthalate ("PET" for short), in the extrusion process.

The conductive shielding layer 130 is wrapped around the outer peripheral surface of the inner insulating layer 120 to provide electromagnetic or signal shielding function for the conductors. In some embodiments, as shown in FIG. 1, the conductive shielding layer 130 may be in the form of a shielding tape wrapped around the outside of the inner insulating layer 120 in the longitudinal direction or along a longitudinal length of the inner insulating layer 120. The presence of the inner insulating layer 120 may prevent the conductive shielding layer 130 from entering the gap between the conductors 110.

For example, the conductive shielding layer 130 may be bonded to the outer peripheral surface of the inner insulating layer 120 by hot-melting or by an adhesive. Exemplarily, the conductive shielding layer 130 may include a conductive layer that is bonded to the inner insulating layer 120 by the adhesive, or there is filler between the conductive shielding layer 130 and the inner insulating layer 120, which may further improve the robustness of the cable. As an example, the conductive layer of the conductive shielding layer 130 is made of aluminum or copper, which may be, for example, an aluminum/polypropylene tape. However, it will be appreciated by those skilled in the art that the present disclosure is not limited to this, and for example, the conductive shielding layer 130 may include a non-conductive matrix and conductive particles located in the non-conductive matrix.

In some embodiments of the present disclosure, the conductive shielding layer 130 may be adapted to be electrically connected to an external grounding to function as a ground wire. For example, the conductive surface of the conductive shielding layer 130 may face outward, that is, the outer insulating layer 140, which facilitates the electrical connection between the conductive shielding layer and the external ground, thereby better improving the shielding effect.

As shown in FIG. 1, the conductive shielding layer 130 has a first end 131 and a second end 132 in a radial cross section, and the first end 131 and the second end 132 are located at different positions in a circumferential direction, so that the conductive shielding layer 130 forms a closed loop in the circumferential direction, so as to further improve the electromagnetic shielding effect. There is no seam between the first end 131 and the second end 132, which can avoid a problem that a complete shielding loop cannot be formed because the seam would become larger during use of the cable in a bent state. For example, in the embodiment of FIG. 1, the first end 131 and the second end 132 of the conductive shielding layer 130 are positioned on two diametrically opposed outside positions of the inner insulating layer 120, respectively. As an example, the conductive shielding layer 130 has portions 133 overlapping with each other between the first end 131 and the second end 132, thereby further improving the electromagnetic shielding effect.

In some other embodiments, the conductive shielding layer 130 may also comprise an extruded layer 130', as shown in FIG. 2, which is closely arranged or fitted to the outer peripheral surface of the inner insulating layer 120, such that the extruded layer 130' and the inner insulating layer 120 are formed in concentric tubes. Thus, compared with the conventional cable in which the shielding tape is wound around or bonded to the inner insulating layer, the conductive shielding layer 130' according to the present disclosure can be integrally and efficiently formed on the outer peripheral surface of the inner insulating layer 120 by the extrusion process, improving the production efficiency, eliminating the winding pitch, and reducing deformation or displacement of the cable structure in use, and significantly improving the performance stability of the cable, for example increasing the high-frequency test bandwidth of the cable to higher frequencies.

In some embodiments, the extruded layer (e.g., the extruded layer 130') of the conductive shielding layer and the insulating sheath 140 may be at least partially co-extruded, thereby further improving the production efficiency and improving the performance of the cable and its stability. As an example, the material of the non-conductive matrix of the extruded layer 130' may be compatible with the material of the insulating sheath 140 or its extruded layer, such as the two materials have the same or similar injection molding or extrusion properties, so that the conductive shielding layer 130 and the insulating sheath 140 are simultaneously formed by co-extrusion process.

Figure 3:
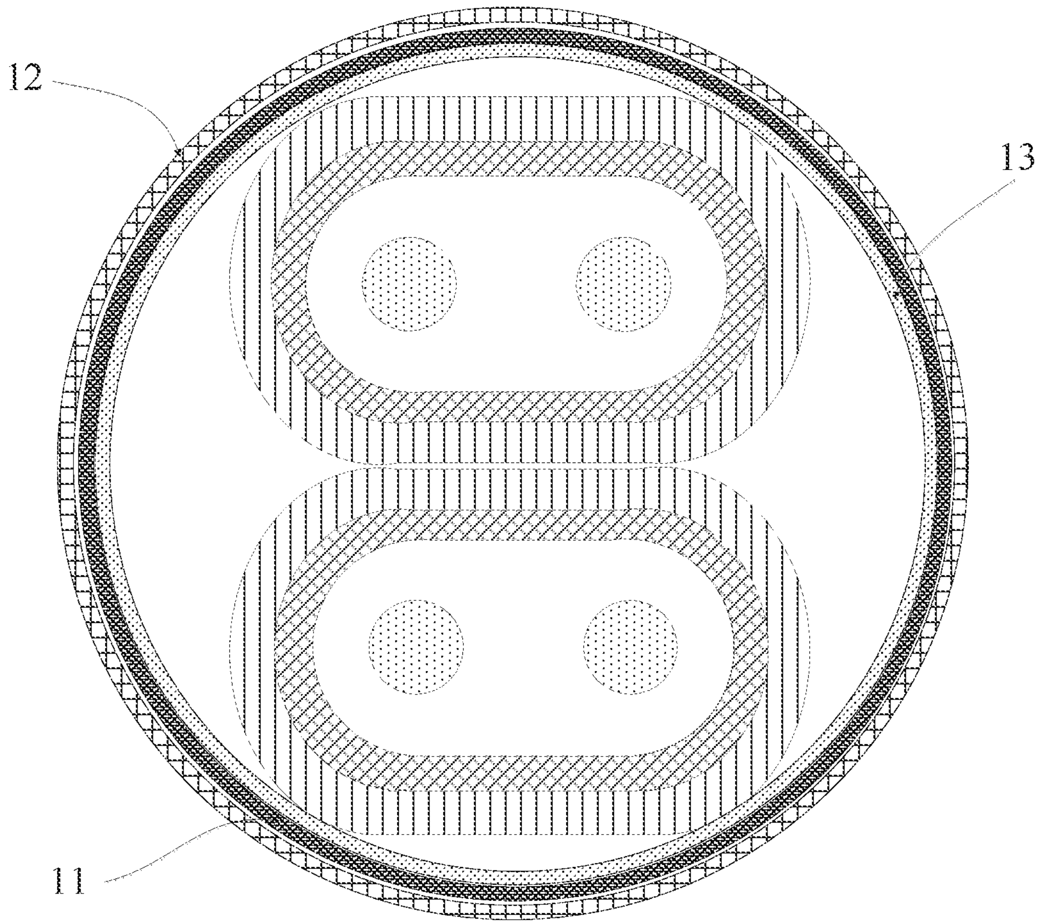
FIG. 3 is a sectional radial view of a structure of a cable assembly according to an embodiment.

According to an embodiment of the present disclosure, there is also provided a cable assembly, as shown in FIG. 3, the cable assembly comprising at least two cables described herein, which may be disposed within an outer sleeve 12. For example, these cables may be twisted or wound with each other in the longitudinal direction. The number of cables of the cable assembly can be two or more, so that more signal, data or power transmission functions can be provided, and there is no signal interference between the cables.

The outer sleeve can be in the form of a sheath, such as a metal tube or a plastic tube, to provide some protection. As shown, the cable assembly also comprises a conductive shielding structure 11 provided within the outer sleeve 12, and the conductive shielding structure 11 may take the form of a layer/tape of metal or other conductive material and is wrapped or wound around an outside of the all cables to provide improved electromagnetic shielding effect.

In some examples, as shown in FIG. 3, the cable assembly may further comprise a buffering layer 13 provided between all the cables and the conductive shielding structure 11 to provide external force buffering or vibration damping function for the cables. In other examples, a space between the cables and/or a space between the cables and the buffering layer or the shielding layer may be at least partially filled with the filler.

Although the above embodiments of the present disclosure have been shown and described, it would be appreciated by those skilled in the art that various changes or modifications may be made to these embodiments without departing from the principles and spirit of the disclosure, the scope of which is defined by the appended claims and their equivalents. It should be noted that, the terms "comprise", "include" and "have" as used herein doesn't exclude other elements or steps. In addition, any reference numerals in the claims should not be interpreted as the limitation to the scope of the present disclosure.

What is claimed is:

1. A cable, comprising:

a pair of conductors extending longitudinally and spaced apart from each other;

an inner insulating layer circumferentially extending around an outside of the conductors and fixing the conductors, the inner insulating layer is a single extruded layer wrapped around all of the conductors along a longitudinal length of the conductors;

a conductive shielding layer circumferentially extending around an outside of the inner insulating layer, the conductive shielding layer includes a non-conductive matrix and a plurality of conductive particles in the non-conductive matrix;

an insulating sheath extending around an outer peripheral surface of the conductive shielding layer, the insulating sheath includes an extruded layer and a heat shrinkable sleeve disposed around the extruded layer; and a filler between the conductive shielding layer and the inner insulating layer, the filler does not attach the conductive shielding layer to the inner insulating layer.

2. The cable of claim 1, wherein the extruded layer is a continuous insulating layer extending longitudinally over the outer peripheral surface of the conductive shielding layer.

3. The cable of claim 1, wherein the conductive shielding layer is a conductive shielding tape circumferentially extending around the inner insulating layer along a longitudinal length of the inner insulating layer.

4. The cable of claim 3, wherein the conductive shielding layer has a first end and a second end in a radial cross-section, the first end and the second end are located at different positions in a circumferential direction so that the conductive shielding layer forms a closed loop in the circumferential direction.

5. The cable of claim 4, wherein the first end and the second end of the conductive shielding layer are positioned on two diametrically opposed sides of the inner insulating layer.

6. The cable of claim 4, wherein the conductive shielding layer has a plurality of portions overlapping each other between the first end and the second end.

7. The cable of claim 1, wherein the conductive shielding layer is electrically connected to an external grounding.

8. The cable of claim 1, wherein the cable has a frequency bandwidth of up to 60 GHz or higher.

9. The cable of claim 1, wherein the conductive shielding layer is bonded to an outer peripheral surface of the inner insulating layer.

10. The cable of claim 9, wherein the conductive shielding layer is bonded to the outer peripheral surface by hot-melting.

* * * * *